(12) United States Patent
Stansbury et al.

(10) Patent No.: US 9,004,117 B2
(45) Date of Patent: Apr. 14, 2015

(54) INFLATOR

(75) Inventors: Ethan T. Stansbury, Tustin, CA (US);
Brandt A. Haener, Los Osos, CA (US);
Brendan P. Kelso, Alascadero, CA (US)

(73) Assignee: Illinois Tool Works Inc., Glenview, IL (US)

( * ) Notice: Subject to any disclaimer, the term of this patent is extended or adjusted under 35 U.S.C. 154(b) by 260 days.

(21) Appl. No.: 13/608,830

(22) Filed: Sep. 10, 2012

(65) Prior Publication Data

US 2013/0105044 A1 May 2, 2013

Related U.S. Application Data

(60) Provisional application No. 61/553,357, filed on Oct. 31, 2011.

(51) Int. Cl.
*B65B 1/30* (2006.01)
*F04B 35/06* (2006.01)
*B60C 29/00* (2006.01)
*F04B 53/16* (2006.01)

(52) U.S. Cl.
CPC .................. *F04B 35/06* (2013.01); *B60C 29/00* (2013.01); *F17C 2205/0111* (2013.01); *F17C 2205/0165* (2013.01); *F17C 2221/031* (2013.01); *F17C 2223/0123* (2013.01); *F17C 2223/033* (2013.01); *F17C 2227/0157* (2013.01); *F17C 2250/043* (2013.01); *F17C 2270/07* (2013.01); *F17C 2270/0772* (2013.01); *F04B 53/16* (2013.01)

(58) Field of Classification Search
CPC ........................................................ B60C 29/00
USPC .............. D7/602, 605; D9/721; D3/260, 276; 417/234; 141/198; 190/39, 102, 115; 220/737, 738; 206/549
See application file for complete search history.

(56) References Cited

U.S. PATENT DOCUMENTS

D368,206 S * 3/1996 Wedi ............................... D7/605
D434,423 S * 11/2000 Wang ............................... D15/9
D614,001 S * 4/2010 Welch ............................ D7/605

* cited by examiner

*Primary Examiner* — Jason K Niesz
(74) *Attorney, Agent, or Firm* — Pauley Petersen & Erickson

(57) ABSTRACT

An exemplary embodiment can be inflator having an integrated compressor and carry handle. The compressor can include a housing having a top surface contoured to form at least a first portion of a first container holder. The carry handle can he foldable between a first upright carry position and a second folded position wherein the carry handle lies flush with a top surface of the compressor housing. The carry handle can include an inner grasping area contoured to form at least a second portion of the first container holder when the carry handle is in the folded position and wherein the carry handle second portion of the first container holder is complementary to the compressor housing first portion of the first container holder.

9 Claims, 2 Drawing Sheets

INFLATOR

CROSS-REFERENCE TO RELATED APPLICATION

This application claims the benefit of U.S. Provisional Patent Application Ser. No. 61/553,357, filed 31 Oct. 2011.

BACKGROUND OF THE INVENTION

1. Field of the Invention

This invention relates to inflators such as particularly adapted for use in camping, recreational and the like environments.

2. Description of Related Art

Inflators are often used in camping and the like or similar recreational applications such as for inflating rafts, tires and other inflatable devices. Inflators typically include a compressor, a hose and/or a gauge for inflating the device to a desired pressure. As such, inflators are often found at campsites and similar such recreational environments where additional functions particularly related to such environments may be desirable.

SUMMARY OF THE INVENTION

The present invention is directed to an inflator such as particularly suited for use in camping or similar recreational applications.

In accordance with one aspect of the invention, there is provided an inflator that includes an integrated compressor and carry handle that provide at least one integrated container holder.

More particularly, in accordance with one preferred embodiment, the compressor includes a housing having a top surface contoured to form at least a first portion of a container holder. The carry handle is foldable between a first upright carry position and a second folded position wherein the carry handle lies flush with a top surface of the compressor housing. The carry handle includes an inner grasping area contoured to form at least a second portion of the first container holder when the carry handle is in the folded position, the carry handle second portion of the first container holder being complementary to the compressor housing first portion of the container holder.

According to another embodiment, there is provided an inflator that includes an integrated compressor and a carry handle. The compressor includes a housing having a lop surface contoured to form at least a first portion of each of circular cross section first and second container holders. The carry handle is foldable between a first upright carry position and a second folded position flush with the compressor housing top surface. The carry handle includes an inner grasping area contoured to form at least a second portion of each of the circular cross section first and the second container holders when the carry handle is in the folded position. The carry handle second portion of each of the two container holders is complementary to the compressor housing first portion of the corresponding container holder. The compressor housing additionally includes an integrated bottle opener and at least one integrated pressure gauge.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
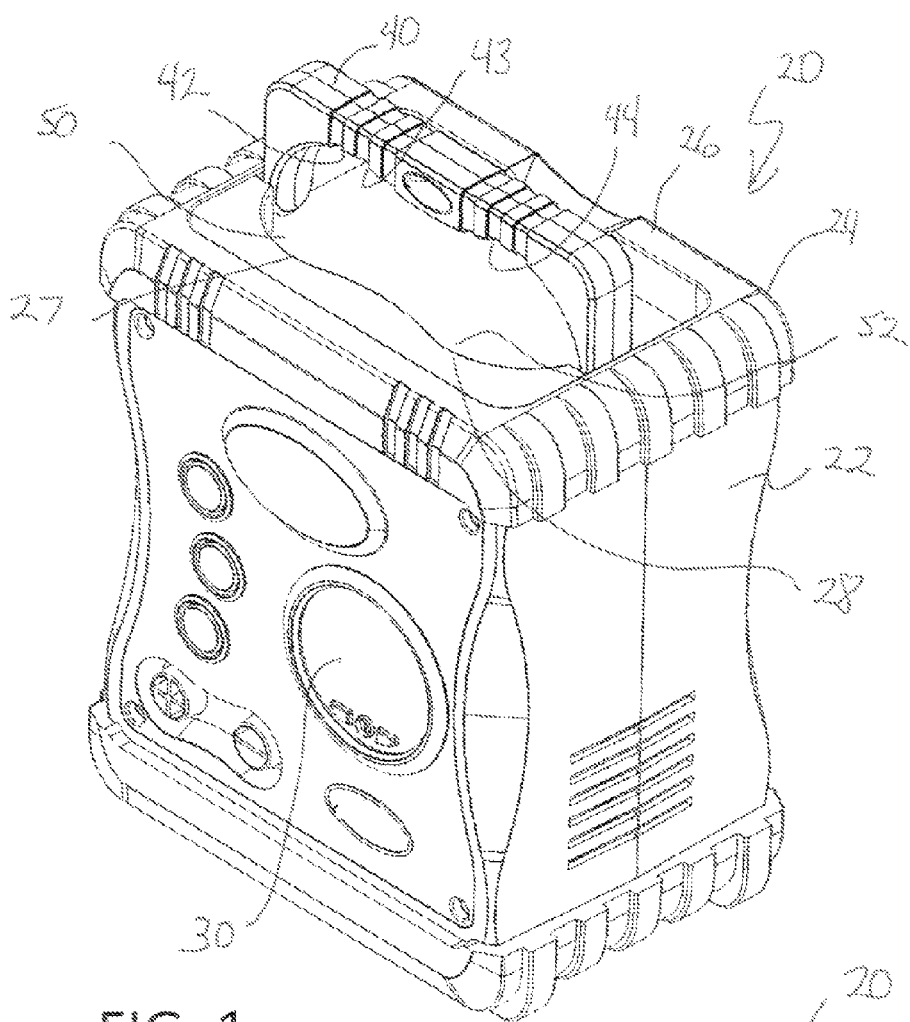
FIG. 1 is a front perspective view of an inflator according to one preferred embodiment of this invention.
Figure 2:
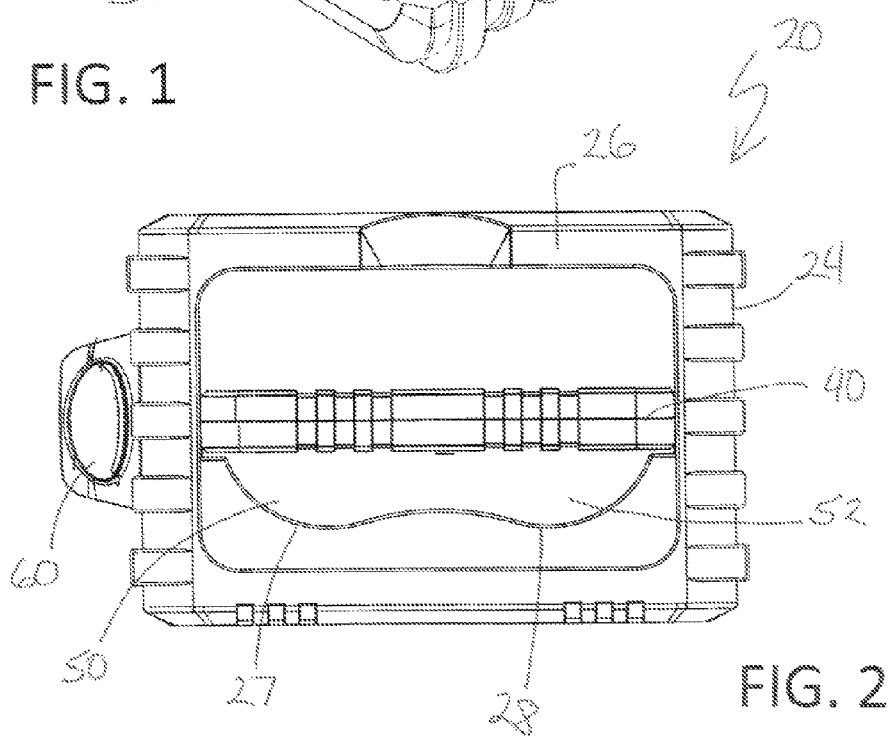
FIG. 2 is a top view of the inflator shown in FIG. 1.
Figure 3:
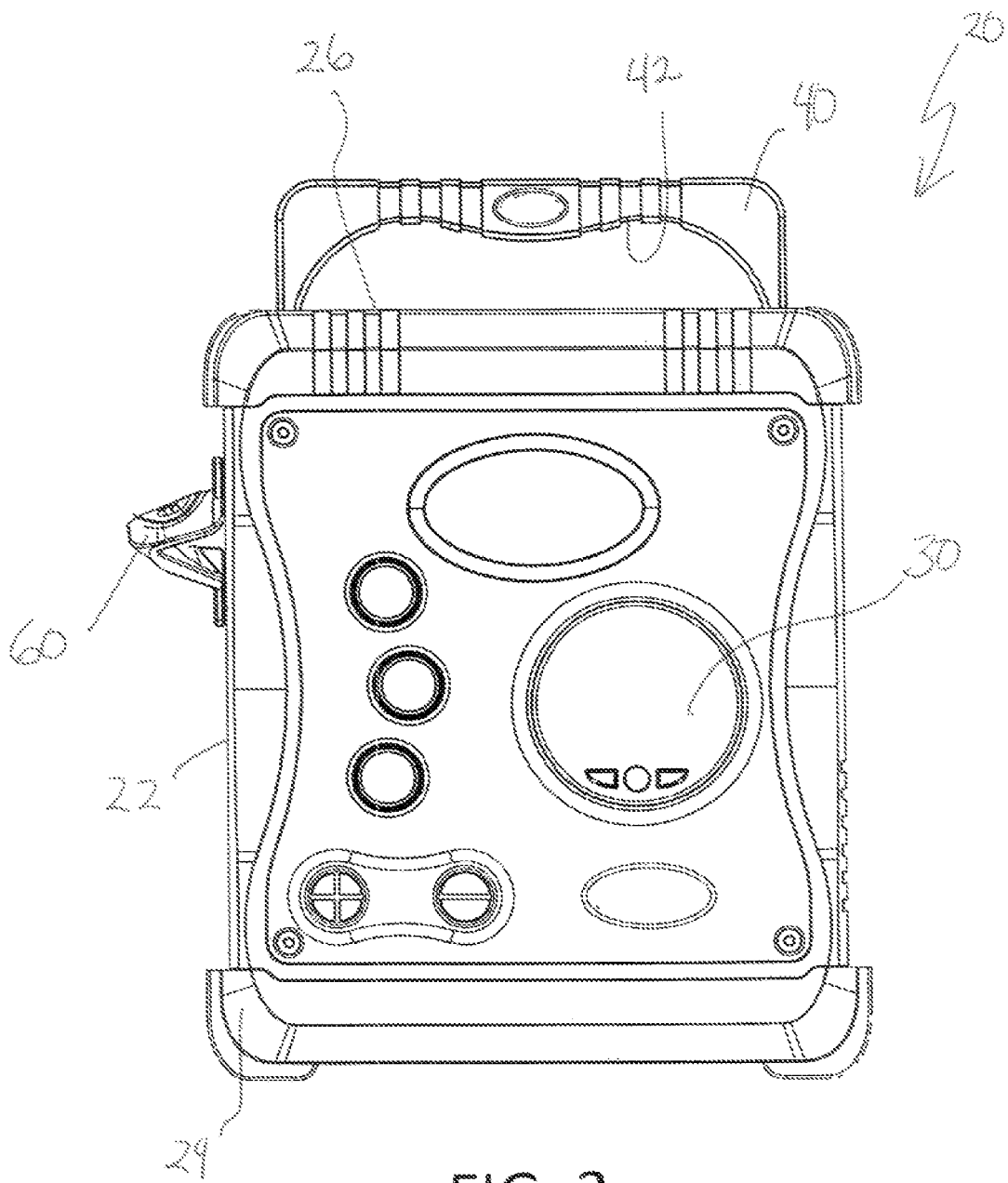
FIG. 3 is a front view of the inflate shown in FIG. 1.

FIGS. 1-3 show an inflator 20 according to a preferred embodiment of this invention. The inflator 20 desirably includes an integrated compressor 22, having a housing 24, and a hose and/or hose attachment (not shown) for inflating a selected inflatable object. While the broader practice of the invention is not necessarily limited to use with or in the inflation of specific inflatable objects, the invention is believed to have particular applicability for use in conjunction with the inflation of objects such as rafts, tires, air mattresses, inflatable flotation devices or similar inflatable devices such as may find common application in association with camping and similar recreational situations.

The inflator 20 may desirably additionally include a gauge 30 integrated therewith such as may be desired for better assuring proper attainment of a desired pressure in or of the associated inflatable device, usually measured in pounds per square inch (psi).

The inflator 20 further preferably includes an integrated carry handle 40 for ease of portability and movement. According to a preferred embodiment of this invention, the handle 40 is foldable into flush engagement with the housing 24 and, more particularly, the top surface 26 of the housing 24. According to a further preferred embodiment of this invention, the handle 40 includes a contoured inner grasping area 42 that follows a desired contour of one or more integrated container holders (e.g., first and second container holders 50 and 52) that are additionally integrated within the top surface 26 of the housing 24. In such manner, when the handle 40 is folded flat or flush with the housing top surface 26, one or, as shown in FIGS. 1 and 2, the two generally circular container holders 50 and 52 are formed into the top surface 26 of the housing 24. For example, the housing top surface 26 can be desirably contoured to form at least a first portion 27 of the first container holder 50 and the carry handle inner grasping area 42 can be desirably contoured to form at least a second portion 43 of the first container holder 50 when the carry handle 40 is in the folded position, such as with the carry handle second portion 43 of the first container holder 50 being complementary to the housing first portion 27 of the first container holder 50. Similarly, the housing top surface 26 can be desirably contoured to form at least a first portion 28 of the second container holder 52 and the carry handle inner grasping area 42 can be desirably contoured to form at least a second portion 44 of the second container holder 52 when the carry handle 40 is in the folded position, such as with the carry handle second portion 44 of the second container holder 52 being complementary to the housing first portion 28 of the first container holder 52.

Through the placement of a container such as a can or bottle in or on such a container holder formed on the top surface of the inflator, a user can safely maintain such a can or bottle while on or at a campsite, job site, tailgate or similar environment.

According to one preferred embodiment of this invention, a bottle opener 60 is additionally integrated with the housing 24. The bottle opener 60 may be positioned in or on a side surface of the housing 24 as shown in FIGS. 2 and 3. As a result of this accessory, a user can open a bottle with the inflator 20 and then safely keep the bottle in an upright position within the container holder 50.

While in the foregoing specification this invention has been described hi relation to certain preferred embodiments thereof and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator comprising:
   a compressor, the compressor including a housing, the housing having a top surface contoured to form at least a first portion of a first can or bottle holder; and
   an integrated carry handle, the carry handle foldable between a first upright carry position and a second folded position wherein the carry handle lies flush with a top surface of the compressor housing, the carry handle comprising an inner grasping area contoured to form at least a second portion of the first can or bottle holder when the carry handle is in the folded position and wherein the carry handle second portion of the first can or bottle holder is complementary to the compressor housing first portion of the first can or bottle holder.

2. The inflator of claim 1 wherein the first can or bottle holder comprises a circular cross section.

3. The inflator of claim 1 wherein the top surface of the compressor housing is contoured to form at least two can or bottle holders.

4. The inflator of claim 3 wherein the can or bottle holder contoured top surface of the compressor housing is contoured to form at least a first portion of each of at least two circular cross section can or bottle holders.

5. The inflator of claim 4 wherein the carry handle comprises an inner grasping area and wherein the carry handle inner grasping area is contoured to form at least a second portion of each of the two can or bottle holders when the carry handle is in the folded position and wherein the carry handle second portion of each of the two can or bottle holders is complementary to the compressor housing first portion of the corresponding can or bottle holder.

6. The inflator of claim 1 wherein the compressor housing additionally comprises an integrated bottle opener.

7. The inflator of claim 1 wherein the compressor housing additionally comprises at least one integrated pressure gauge.

8. An inflator comprising:
   a compressor, the compressor including a housing having a top surface contoured to form at least a first portion of each of circular cross section first and second container holders; and
   an integrated carry handle, the carry handle foldable between a first upright carry position and a second folded position flush with the compressor housing top surface, the carry handle comprising an inner grasping area contoured to form at least a second portion of each of the circular cross section first and the second container holders when the carry handle is in the folded position and wherein the carry handle second portion of each of the two container holders is complementary to the compressor housing first portion of the corresponding container holder;
   wherein the compressor housing additionally comprises an integrated bottle opener; and
   wherein the compressor housing additionally comprises at least one integrated pressure gauge.

9. The inflator of claim 8 wherein each of the first and second container holders comprise a circular cross section.

\* \* \* \* \*